United States Patent [19]
Caldwell

[11] Patent Number: 5,835,774
[45] Date of Patent: Nov. 10, 1998

[54] EFFICIENT 32-BIT BASED CASE TABLE SUPPORT FOR 64-BIT ARCHITECTURES

[75] Inventor: Jeffrey B. Caldwell, Sunnyville, Calif.

[73] Assignee: Hewlett-Packard Company, Palo Alto, Calif.

[21] Appl. No.: 641,302

[22] Filed: Apr. 30, 1996

[51] Int. Cl.$^6$ .................................................. G06F 9/45
[52] U.S. Cl. ........................ 395/705; 395/709; 395/500
[58] Field of Search .................................... 395/500, 705, 395/707, 709

[56] References Cited

U.S. PATENT DOCUMENTS

| | | | |
|---|---|---|---|
| 5,210,839 | 5/1993 | Powell et al. ........................... | 395/400 |
| 5,339,420 | 8/1994 | Hoxey . | |
| 5,430,864 | 7/1995 | Powell et al. ........................... | 395/500 |
| 5,487,158 | 1/1996 | Amelina ety al. ....................... | 395/375 |

OTHER PUBLICATIONS

W.J. Rottenkolber, et al., Jump and Execute Tables For Directing Program Control Flow, Nov. 1994, Fourth Dimensions, pp. 13–16.

L.V. Atkinson, Optimizing Two–State Case Statements In Pascal, Nov. 1980, Software–Practice & Experience, vol. 12, pp.571–581.

J.L. Hennessy, et al., Compilation Of The Pascal Case Statement, May 1982, Software–Practice & Experience, vol. 12, pp. 879–882.

R.L. Bernstein, Short Comunication, Jan. 1985, Software–Practice & Experience, vol. 15, pp. 1021–1024.

E. Amiel, et al., Optimizing Multi–Method Dispatch Using Compressed Dispatch Tables, Oct. 1994, Association of Computing Machinery, pp. 244–258.

"Shade: A Fast Instruction—Set Simulator for Execution Profiling", Cmelik R. et al., ACM, 1994.

*Primary Examiner*—James P. Trammell
*Assistant Examiner*—Kakali Chaki
*Attorney, Agent, or Firm*—Denise A. Lee

[57] ABSTRACT

The present invention describes a system and method to efficiently implement case table constructs for integral datatypes larger than the native underlying register size of the architecture. The method for generating case table constructs for a n-bit case variable on a computer system having a m-bit architecture, where n is greater than m, includes the step of determining whether the n-bit case variable can be represented in m bits. Since the code for a m-bit case variable is more efficient than the code for a n-bit case variable, the present invention determines which case variables require code for n-bit values and which case variables can be implemented in the more efficient code for m-bit values. If the case variable can be reduced to m-bits then the present invention uses the more efficient m-bit case variable code for implementation. Otherwise, the less efficient n-bit case variable code is used. The invention describes an efficient method for performing this test at runtime.

7 Claims, 11 Drawing Sheets

A:    IF CASE_VAR = 1 Goto LAB1    ⟋ 116
      IF CASE_VAR = 2 Goto LAB2
      IF CASE_VAR = 10 Goto LAB3
      Goto DONELABEL LAB1:  _____
       _____  } 114a
       _____

Goto DONELABEL

LAB2:  _____
       _____  } 114b
       _____

Goto DONELABEL

LAB3:  _____
       _____  } 114c
       _____

DONELABEL:

*Figure 1*

```
LTBL:   DEFAULT ADDR
100:    ADDR OF CODE FOR INDEX 1
        ADDR OF CODE FOR INDEX 2
        DEFAULT ADDR
        DEFAULT ADDR
        DEFAULT ADDR
        DEFAULT ADDR
        DEFAULT ADDR
        DEFAULT ADDR
        DEFAULT ADDR
        ADDRESS OF CODE FOR INDEX 10
```

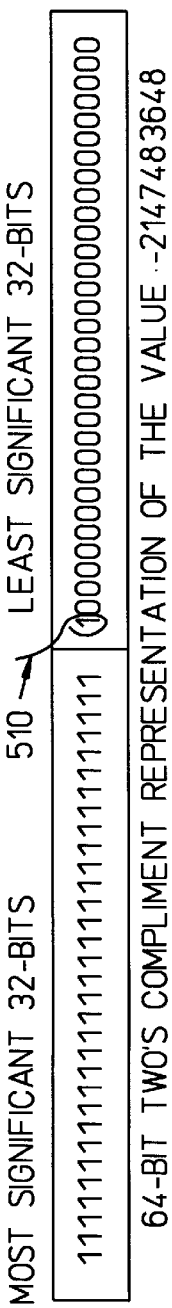
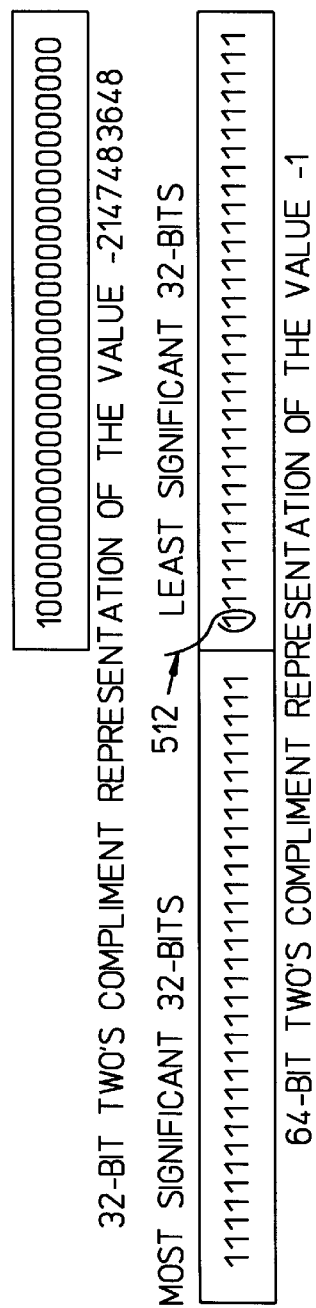
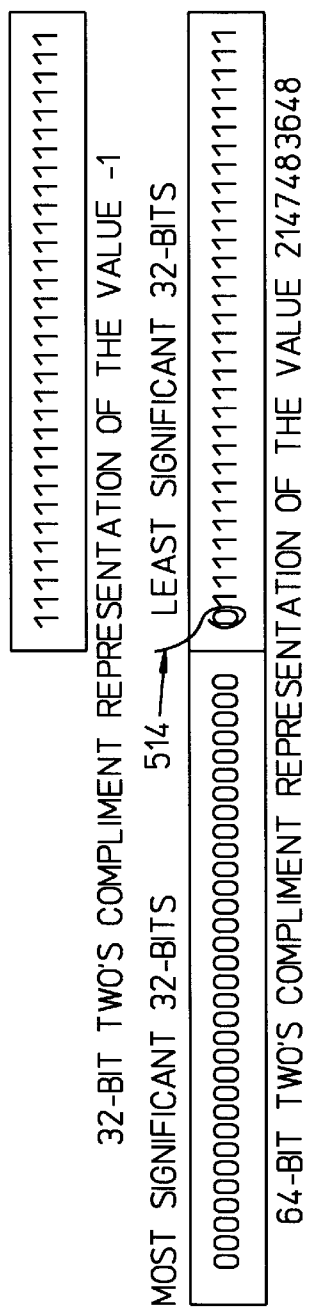
Figure 5A — 64-BIT TWO'S COMPLIMENT REPRESENTATION OF THE VALUE -2147483648
Figure 5B — 32-BIT TWO'S COMPLIMENT REPRESENTATION OF THE VALUE -2147483648
Figure 5C — 64-BIT TWO'S COMPLIMENT REPRESENTATION OF THE VALUE -1
Figure 5D — 32-BIT TWO'S COMPLIMENT REPRESENTATION OF THE VALUE -1
Figure 5E — 64-BIT TWO'S COMPLIMENT REPRESENTATION OF THE VALUE 2147483648
Figure 5F — 32-BIT TWO'S COMPLIMENT REPRESENTATION OF THE VALUE 2147483648

```
EXTRS      Rlo, 31, 1 Rtemp
COMBT,=,N  Rlo, Rtemp,$equivalent
```

$not_equivalent: code to execute when the values are not equivalent $equivalent:    code to execute when the values are equivalent

```
        EXTRS            Rcv2, 31, 1, Rtemp

COMBT, <>, N     Rcv1, Rtemp, $L64

$L32: CODE FOR 32 BIT CASE TABLE
                 •
                 •

B, N             $End_of_Case $L64: CODE FOR 64 BIT CASE TABLE
                 •
                 •
$End_of_Case:    •
                 •
```

EFFICIENT 32-BIT BASED CASE TABLE SUPPORT FOR 64-BIT ARCHITECTURES

BACKGROUND OF THE INVENTION

It is increasingly common to find support of 64-bit integral datatypes in programming languages. Examples are the "long long" datatype in the C programming language and the "INTEGER*8" datatype in the Fortran programming language. Most programming languages also support the concept of a "case table." A case table is a programming language construct which includes a number of different code sequences that are conditionally executed based on the run-time value of a case variable.

Historically, the size of a case variable was limited to a size no larger than the native register size supported on the underlying architecture. For example, a 32-bit architecture would provide support for an integral case variable that was 32 bits in size. However, since a 64-bit case variable offers a greater range of representable values compared to a 32-bit data type, it is desirable to support 64-bit case variables. When a 32-bit architecture is being used, the current methods and systems available for supporting a 64-bit integral case variable are either inefficient or prohibitive due to the large amount of memory required for implementation. Further, in many situations the compiler used in a 32-bit architecture computer cannot support 64-bit integral case variables resulting in a compiler error when presented with the 64-bit integral case variable.

One prior implementation of supporting a 64-bit case variable on a 32-bit architecture generates code to examine all 64-bits of the case variable. All 64-bits of the case variable are compared against each possible case index until a match is found to determine which case table code sequence to execute. Referring to FIG. 1 shows a case table implementation for comparing a case variable against each possible case index. The value of the case variable determines the code sequence 114a, 114b, 114c to be executed.

FIG. 2A shows a flowchart of an assembly language code implementation that corresponds to code line 116 in FIG. 1. The implementation in FIG. 2A is for a 32-bit case variable on an underlying architecture having a 32-bit native register size. Similarly, FIG. 2B shows a flowchart of an assembly language code implementation that corresponds to code line 116 in FIG. 1. The implementation in FIG. 2B, however, is for a 64-bit case variable on an underlying architecture having a 32-bit native register size. The number of steps (and instructions) required for a 64-bit case variable (FIG. 2B) is greater than the number of steps required for a 32-bit case variable (FIG. 2A). Thus for an architecture that supports only one 32-bit comparison per instruction, the method shown in FIG. 2B is an inefficient approach since it requires two comparisons per case index.

Another solution uses the more efficient concept of a lookup table. The lookup table implementation utilizes an in-memory table which contains an entry for every possible case index, ranging from the minimum possible case index to the maximum possible case index. FIG. 3A shows a lookup table used in the implementation of the case table shown in FIG. 1. FIG. 3B shows a flowchart that corresponds to FIG. 1 for a 32-bit lookup table implementation.

Lookup tables are generally used when the range between the minimum and maximum case indices is not very large. Although lookup tables are used for 32-bit case variables, because the range between the minimum and maximum case indices is so large for 64-bit variables, lookup tables have not typically been used for 64-bit case constructs. Although the lookup table implementation is more efficient, the memory required for a 64-bit case variable can be prohibitive. When including the possibility of a single 64-bit case index, the table size can grow extremely large, requiring more memory than is available in the computer.

An efficient method and apparatus for executing code sequences when the native register size is less than the case variable size which minimizes the amount of memory used is needed.

SUMMARY OF THE INVENTION

The present invention describes a system and method to efficiently implement case table constructs for integral datatypes larger than the native underlying register size of the architecture. The system and method separates the case table into an efficient 32-bit component and a less efficient 64-bit component. The method for generating case table constructs for a n-bit case variable on a computer system having a m-bit architecture, where n is greater than m, includes the steps of: determining whether the n-bit case variable can be represented in m bits; generating a first list of m-bit case indices, the minimum number of bits the m-bit case indices can be represented in being a number less than or equal to m; generating a second list of n-bit case indices, the minimum number of bits the n-bit case indices can be represented in being a number greater than m. After the first list of m-bit indices and the second list of n-bit case indices are generated, runtime code is generated to select the case table construct for the first list of m-bit indices or to select the case table construct for the second list of n-bit case indices.

For the case where m is equal to 32 and n is equal to 64, the full 64-bit values cannot be represented in a single 32-bit register. Two registers are required to represent a 64-bit value. This invention recognizes that in many cases, the two's complement arithmetic value of a 64-bit value can, in fact, be represented in only 32-bits. If each bit in the uppermost 32-bits of a 64-bit value is equal to the value of the most significant bit of the lower 32-bits of a 64-bit value, then the 64-bit value can be arithmetically represented in only 32 bits.

Since the case table construct code for a 32-bit value is more efficient than the code for a 64-bit case construct, the present invention determines which case indices require code for 64-bit value and which case indices can be implemented in the more efficient code for 32-bit values. With this knowledge, it is possible to break the strategy for case table generation into two components: an efficient 32-bit strategy and a more expensive but rarely executed 64-bit strategy. Previous solutions to implementing 64-bit case tables on a 32-bit architecture result in incurring the fall penalty of 64-bit case table processing and 64-bit comparisons for the set of case index values that this invention can identify and process more efficiently. If the case variable comparison can be reduced to 32-bits then the present invention uses the more efficient 32-bit value code for implementation. Otherwise, the less efficient 64-bit code is used.

According to the present example of a 32-bit underlying architecture, a first step is determining whether the 32-bit code can be utilized is determining which 64-bit case indices can be represented in m bits or less. After determining which m-bit case indices can be represented in m bits or less, the next step is generating a first list of m-bit case indices (the minimum number of bits the m-bit case indices can be represented in being a number less than or equal to m) and a second list of n-bit case indices (the minimum number of bits the n-bit case indices can be represented in being a number greater than m.) After generating the first and second lists of case indices, run-time code is generated. In a first preferred embodiment the run-time code for the first list of m-bit case indices includes a first set of instructions corresponding to the first list of m-bit case indices and a second set of instructions corresponding to the second list of n-bit case indices.

In an alternative embodiment, the run-time code is generated for a lookup table. Case lookup tables are efficient for implementing case tables. The disadvantage of lookup tables is that they require an amount of memory equal to the difference between the smallest and largest case index. Thus as the range between the smallest and largest potential case variable value increases, the lookup table implementation becomes less memory efficient to implement. However, by identifying and separating out the 64-bit case indices, the present invention often returns a difference that can be implemented in the memory available.

A further understanding of the invention described herein may be realized by reference to the remaining portion of the specification and the attached drawings.

BRIEF DESCRIPTION OF THE DRAWINGS

FIG. 1 shows a case table implementation for comparing a case variable against each possible case index for a case table with the three indices: 1, 2 and 10.

FIG. 5A shows the 64-bit two's complement representation of the value −2147483648.

FIG. 5B shows the 32-bit two's complement representation of the value −2147483648.

FIG. 5C shows the 64-bit two's complement representation of the value −1.

FIG. 5D shows the 32-bit two's complement representation of the value −1.

FIG. 5E shows the 64-bit two's complement representation of the value 2147483647.

FIG. 5F shows the 32-bit two's complement representation of the value 2147483647.

DETAILED DESCRIPTION OF THE PREFERRED EMBODIMENTS

Figure 2A:
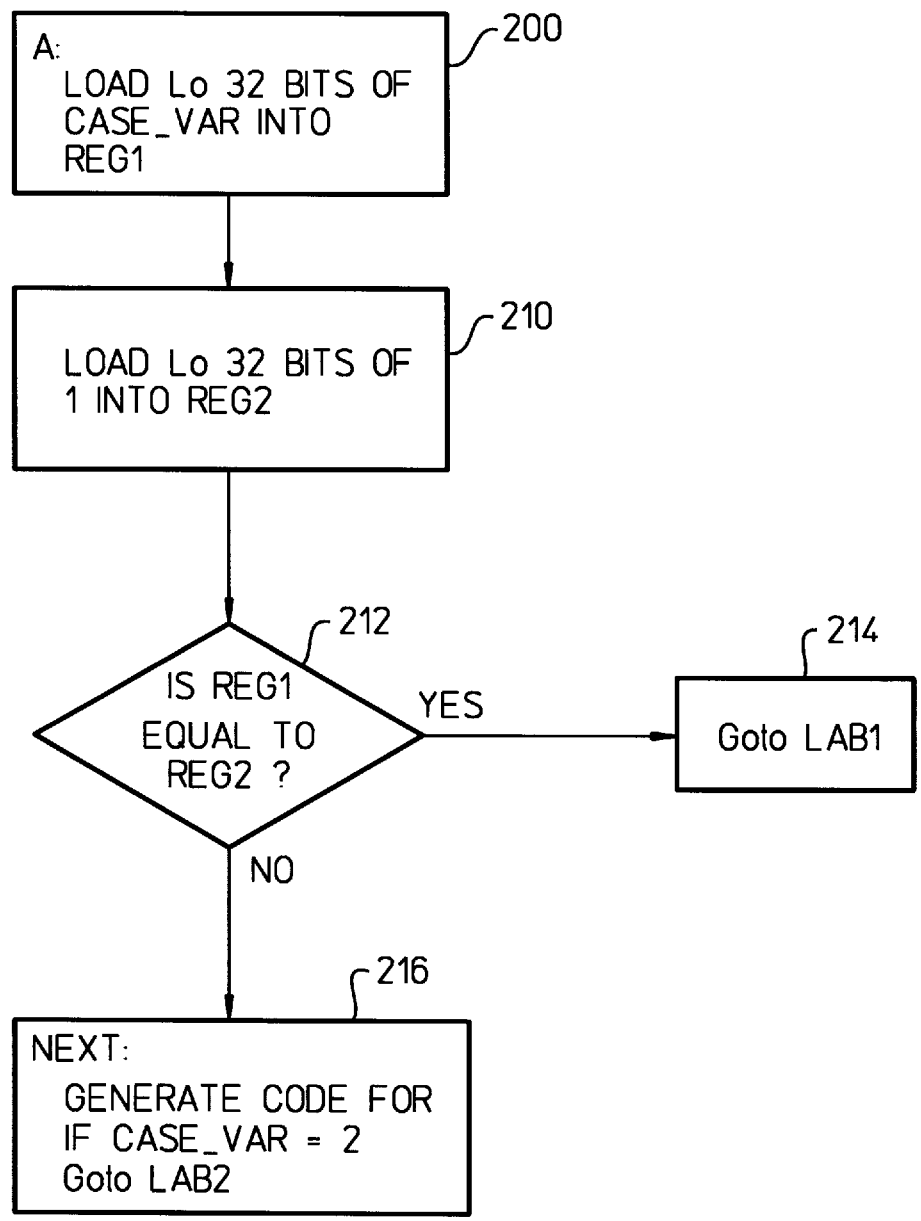
FIG. 2A shows a 32-bit assembly language code implementation that is equivalent to code line 116 in FIG. 1.

The present invention describes a system and method to separate a case table into an efficient 32-bit component and a less efficient 64-bit component and to perform an efficient run-time check to determine which component to execute. The method for generating case table constructs for a n-bit case variable on a computer system having a m-bit architecture, where n is greater than m, includes the steps of: determining whether the n-bit case indices can be represented in m bits 410; generating a first list of m-bit case indices 412, the minimum number of bits the m-bit case indices can be represented in being a number less than or equal to m; generating a second list of n-bit case indices 414, the minimum number of bits the n-bit case variable can be represented in being a number greater than m. After, the first list and second list of indices are generated, runtime code is generated to determine which case table to execute 420, either the case table corresponding to the more efficient first list of m-bit case indices or the case table corresponding to the second list of n-bit indices. A single instruction or sequence of instructions may be used to implement both the step of determining whether to execute a case table corresponding to the first list of indices and the step of determining whether to execute a case table corresponding to the second list of indices. After a determination has been made as to which case table is to be executed a first case table from the first list of n-bit case variables is generated and a second case table from the second list of n-bit case indices is generated.

On a m-bit architecture, full n-bit values cannot be represented in a single m-bit register. For the example, if m=32 and n=64, two registers are required to represent a 64-bit value. A first step in the present invention is determining whether a n bit value can be represented in m bits. Although m and n may be any integer value and different methods of determining whether the n-bit value can be represented in m-bits may be used, in the preferred embodiment n is equal to two times the value of m.

Referring to FIGS. 5A–5F shows three examples of 32-bit two's complement values and their corresponding 64-bit two's complement values. FIG. 5A shows the 64-bit two's complement representation of the value −2147483648, while FIG. 5B shows the 32-bit two's complement representation of the value −2147483648. FIG. 5C shows the 64-bit two's complement representation of the value −1. FIG. 5D shows the 32-bit two's complement representation of the value −1. FIG. 5E shows the 64-bit two's complement representation of the value 2147483647 while FIG. 5F shows the 32-bit two's complement representation of the value 2147483647.

This invention recognizes that in many cases, the two's-complement arithmetic value of a 64-bit value can, in fact, be represented in only 32-bits. The arithmetic equivalence of the numerical examples of FIG. 5A and FIG. 5B, FIG. 5C and FIG. 5D, and FIG. 5E and FIG. 5F can be quickly determined. If each bit of the uppermost 32-bits of a 64-bit value has the same value as the most significant bit of the lower 32-bits, then the 64-bit value can be arithmetically represented in only 32 bits.

Referring to FIG. 5A, arrow 510 pointing to circled bit 31, the MSB of the lower 32 bits of the two's complement value, has a value of 1. Since each bit of the uppermost 32 bits of the 64-bit value also has a value of 1, the 64-bit value can be represented in only 32-bits. Similarly, the MSB of the lower 32 bits in FIG. 5C (see arrow 512) has a value of 1, the same value as each bit of the 32 uppermost bits of the 64-bit value. Thus, the 64-bit value in FIG. 5C can be represented in 32-bits. Further, the MSB of the lowermost 32 bits in FIG. 5E (see arrow 514) has a value of 0, the same value as each bit of the 32 uppermost bits of the 64-bit value. Thus, the 64-bit value in FIG. 5E can be represented in 32-bits. Whether the n-bit value can be represented in m-bits can be determined at compile-time for case indices and at runtime using a short instruction sequence for case variables.

Figures 6A, 6B:
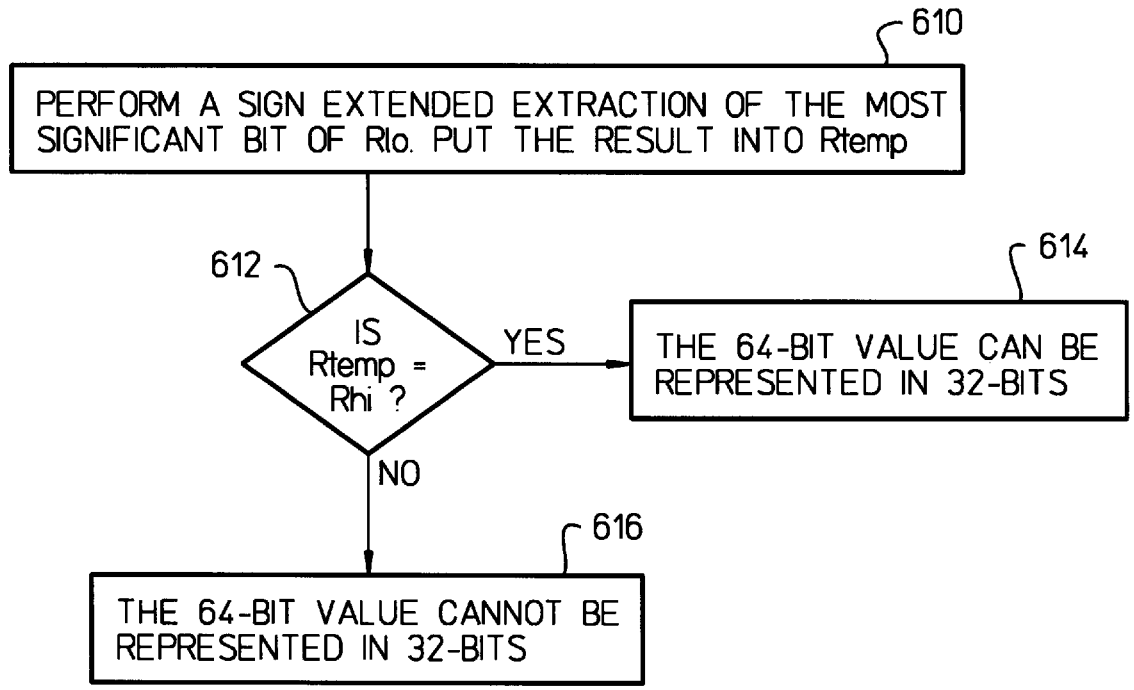
FIG. 6A is a flowchart of the steps at runtime to determine if a 64-bit value can be represented in 32-bits according to the present invention.
FIG. 6B is a PA-RISC instruction sequence that can be used to implement the steps in FIG. 6A

FIG. 6A is a flowchart of the steps to determine at runtime if a 64-bit value can be represented in 32-bits according to the present invention. FIG. 6B shows a PA-RISC instruction sequence required to determine whether an n-bit variable can be represented in m bits. In the example shown in FIGS. 6A and 6B, n is equal to 64 while m is equal to 32. The implementation shown in FIG. 6B is on a PA-RISC 1.1 architecture. Register Rhi contains the most significant 32-bits of the 64-bit case variable and register Rlo contains the least significant 32 bits of the 64-bit case variable. R.I. and Rho can be any general register in the processor's register file. Other RISC architectures have register files which R.I. and Rho can be selected from.

At run-time, the uppermost 32-bits of the 64-bit case variable are compared to the MSB of the lowermost 32 bits of the 64-bit case variable. This comparison can be done according to the steps shown in FIGS. 6A and 6B. For the example shown in FIGS. 6A and 6B, the lowermost 32 bits of the 64-bit twos complement value are stored in register Rlo, while the uppermost 32 bits of the 64-bit twos complement value are stored in register Rhi. A sign extended extraction of the most significant bit of Rlo is performed and the result is stored in the register Rtemp (step 610). The result of the sign extended extraction is then compared to the uppermost 32 bits of the 64-bit value (step 612). This is equivalent to comparing the MSB of the lowermost 32-bits of the 64-bit value to each bit in the uppermost 32 bits of the 64-bit value.

If the sign extended extraction of the most significant bit of Rlo is equal to Rhi, then the 64-bit value can be represented in 32-bits (step 614) and an efficient 32-bit component of the case table can be executed. If the sign extended extraction of the most significant bit of Rio is not equal to Rlo, then the 64 bit value cannot be represented in 32-bits (step 616) and the less efficient 64-bit component of the case table can be executed.

The instruction sequence shown in FIG. 6B is required to be performed a single time per case table execution during run-time to determine if expensive comparisons against full 64-bit case indices is required. The method shown in FIG. 6B is combined with a method for a compiler to separate generated code for case support table into two separate groups: an efficient 32-bit component and a less efficient uncommonly executed 64-bit component. This is an advantage over unconditionally performing the less efficient 64-bit comparisons commonly used to implement 64-bit case tables in 32-bit architectures.

As a compiler is preparing to generate code for a case table that must support n-bit values, two separate lists of case indices are maintained: a m-bit list and a n-bit list. As each case index is presented to the compiler, it is examined to determine if it can be arithmetically represented in m-bits.

For example, if the case index can be represented in 32-bits, it is added to a first list 710 of 32-bit indices to be processed. If the case index must be represented in 64-bits, then it is added to a second list 720 of 64-bit indices to be processed.

Figure 7:
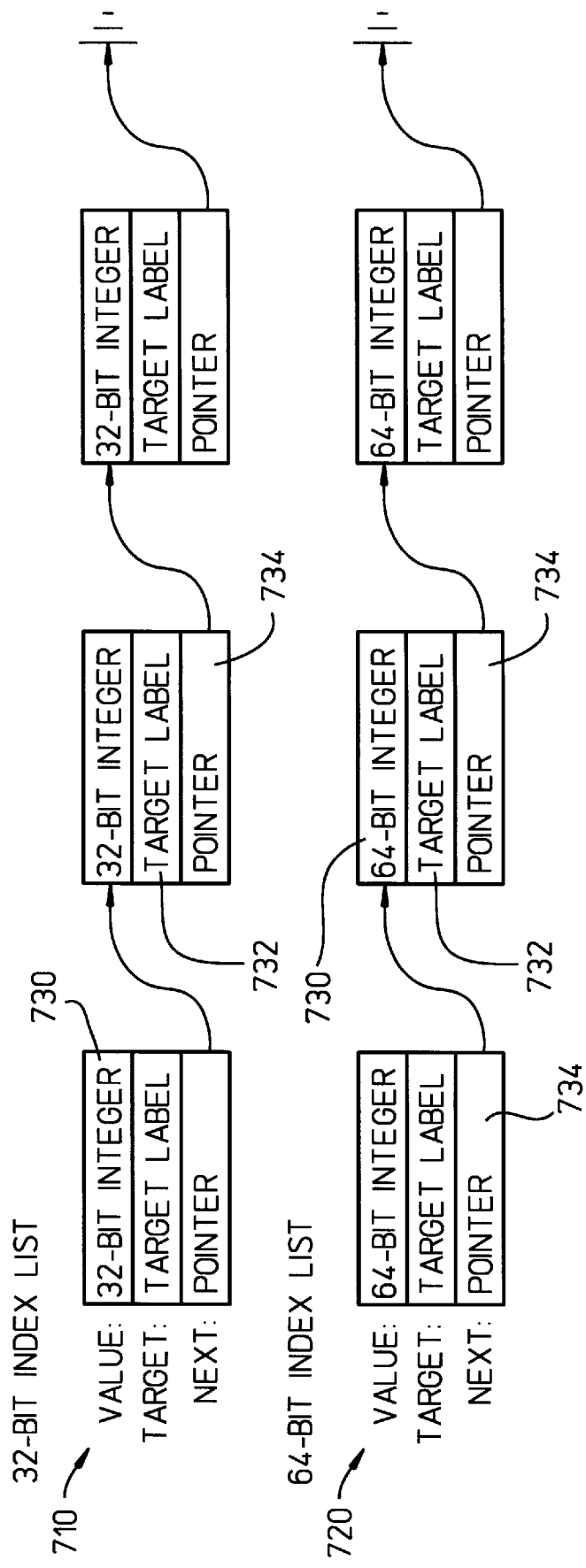
FIG. 7 shows an index list for both a 32-bit indices and a 64-bit indices.

Along with each case index the compiler generates a target label which, when branched to, will execute the appropriate case table code sequence. Therefore, the first list and second list represents a first and second list of case indices. Both the first list and the second list can be thought of as linked lists of records. Referring to FIG. 7 shows a first an index list 710 for both 32-bit indices and a second index list 720 for 64-bit indices. Each record contains three fields: the value 730 of the case index, a target label 732 to branch to if the index matches the case variable, and a pointer 734 to the next label.

Figure 8:
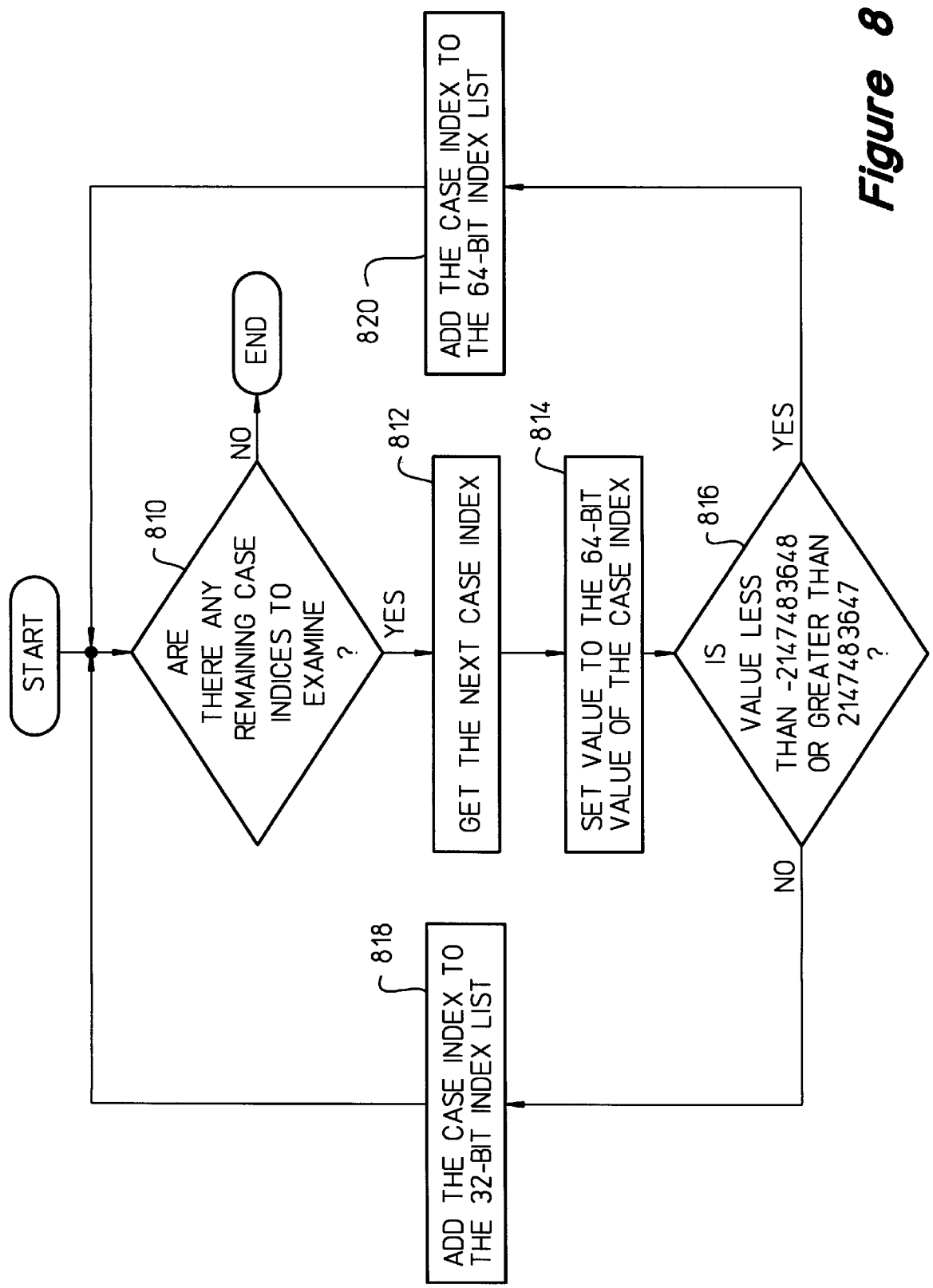
FIG. 8 is a flowchart of the steps for generating the index lists shown in FIG. 7.

When machine code is generated for the case table, the elements of the 32-bit list are used to generate efficient code that supports 32-bit or less values. The elements of the 64-bit list are used to generate less-efficient code to perform processing with the full 64-bit comparisons which are less efficient. The method shown in FIG. 8 is performed by the compiler at compile-time. Therefore, the run-time algorithm shown in FIG. 6 is not used to determine if a 64-bit value can be arithmetically represented in 32-bits. Instead, a test against 2147483647 ($2^{m-1}-1$) and −214783648 ($-2^{m-1}$) is performed, where $2^{m-1}-1$ is the maximum two's complement for a m-bit architecture and $-2^{m-1}$ is the minimum two's complement value for an m-bit architecture. Any 64-bit value greater than 2147483647 or less than −214783648 cannot be arithmetically represented in 32-bits and is added to the 64-bit index list. Any 64-bit value that falls within the inclusive range of −2147483648 to 214783647 can be arithmetically represented in 32-bits and is added to the 32-bit index list.

FIG. 8 is a flowchart of the method for building the first and second list shown in FIG. 7. According to the preferred method of the present invention, each case index is initially represented by a 64-bit integral value. Referring to FIG. 8, if there are remaining case indices, the next case index is retrieved (step 812) and stored in a temporary variable labeled value (step 814). The value stored in the temporary variable labeled value is then tested to see if it is less than −2147483648 or greater than 2147483647 (step 814) . In other words for the current example, each case index is examined to determine whether it cannot arithmetically be represented in 32-bits. If the value stored in the temporary variable labeled value is less than −2147483648 or greater than 2147483647 it is added to the 64-bit index list (step 818); otherwise, it is added to the 32-bit index list (step 820).

Figures 9A, 9B:
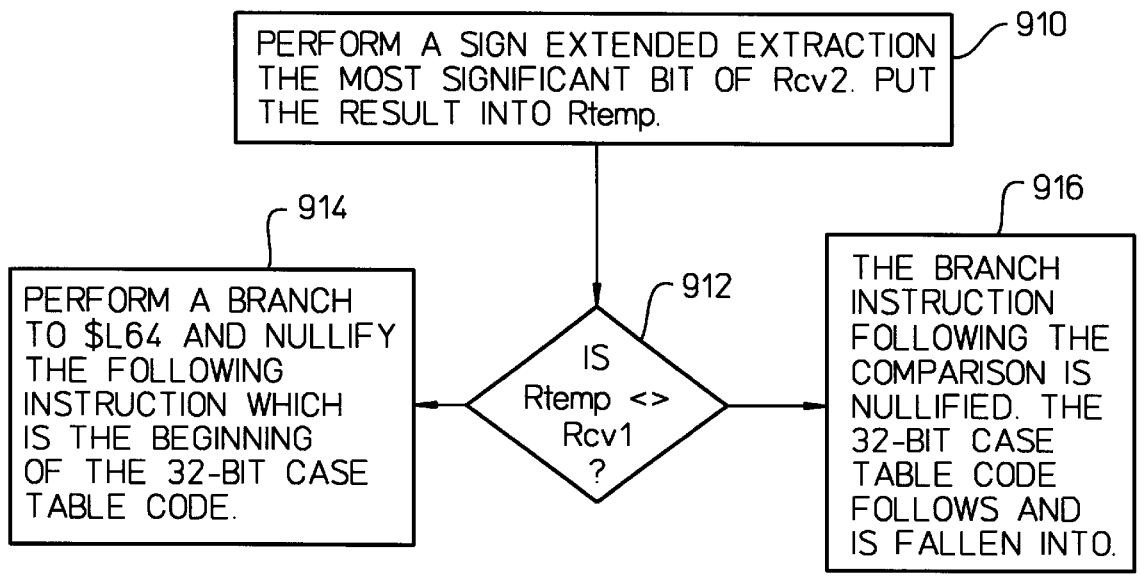
FIG. 9A is a flowchart of the steps performed at run-time for choosing a 32-bit or 64-bit case table.
FIG. 9B is an instruction sequence that can be used to implement the steps shown in FIG. 9A.

Once the compiler has constructed the 32-bit index list (the first list 710) and the 64-bit index list (the second list 720), run-time code is generated to determine whether to execute the case table construct for the first list of m-bit case indices or for the second list of n-bit case indices. Because there are two different lists (a first 32-bit list and a second 64-bit list), the code must determine which list and thus which corresponding code sequence to run. FIG. 9A is a flowchart of the steps performed at run-time for choosing a 32-bit or 64-bit case table. FIG. 9B is an instruction sequence that can be used to implement the steps shown in FIG. 9A.

The methodologies for generating the run-time code to implement the case table constructs for both the first and second lists 710, 720 are well known and are not discussed herein. The present invention instead focuses on a method to identify when 64-bit case indices and case variables can be implemented with a 32-bit case table strategy and a method to generate efficient run-time code to determine when to perform full 64-bit testing or the more efficient 32-bit testing.

Referring to FIG. 9A shows a flowchart of steps for choosing between a 32-bit or 64-bit case table strategy. The method shown in FIG. 9A is performed at run-time. The 64-bit case variable for the case table is held in two 32-bit registers: registers Rcv1 and Rcv2 where register Rcv1 contains the most significant 32 bits of the 64-bit value and register Rcv2 contains the least significant 32-bits of the 64-bit value.

The first step in choosing between the 32-bit and 64-bit case table strategy is determining whether the 64-bit case variable can be arithmetically represented in 32-bits. Preferably, the method of determining whether the 64-bit case variable can be represented in 32-bits is the method shown in FIGS. 6A and 6B. Referring to FIG. 9A, a sign extended extraction is performed on the most significant of the contents of register Rcv1 and the result is stored in the register Rtemp (step 910). The result of the sign extended extraction stored in Rtemp is then checked to see if it is not equal to the value stored in register Rcv1 (the most significant 32 bits of the 64-bit value.) If the result of the sign extended extraction is not equal to the value stored in register Rcv1 (step 912), then the program branches to a sequence of instructions, $L64 (step 914), which is the beginning of the code sequence for implementing a case table for all elements in the second 64-bit index list. If the result of the sign extended extraction is equal to the value stored in register Rcv1, then the program continues to the sequence of instructions $L32 (step 916) which is the beginning of a code sequence that implements a case table for all the elements in the 32-bit index list.

Figure 2B:
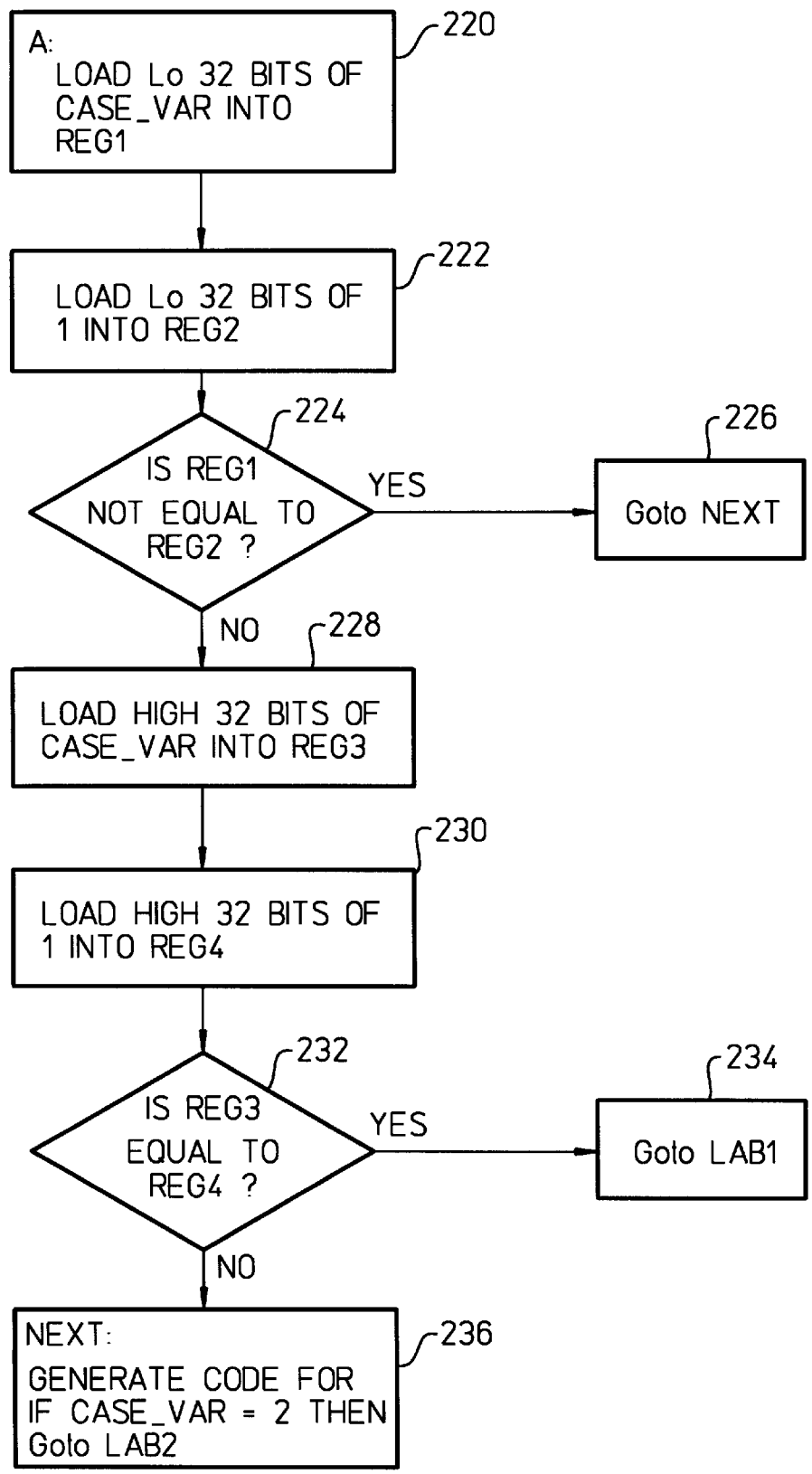
FIG. 2B shows a 64-bit assembly language code implementation that is equivalent to code line 116 in FIG. 1.

The present invention may be applied to architectures that support 64-bit registers and also support implementation of case lookup tables or branch tables. Although the present invention generates run-time code to implement the case table construct for both the first list and second list of case variables, the run-time code generated for implementing the index matching methodology shown in FIGS. 2A and 2B, is different from the run-time code generated to implement the lookup table methodology shown in FIGS. 3 and 4. Case lookup tables and branch tables are efficient methods to implement case tables with the draw back that they require an amount of memory equal to the difference between the largest and smallest case index. Since most case indices fall within a small range, addition of a single 64-bit case index can cause the difference between the smallest and largest value to be too large to allow lookup or branch table support. Identifying and separating out the 64-bit case indices often returns the difference between the largest and smallest indices to a point at which lookup tables and jump tables can be implemented. Previous solutions do not take this into consideration and are therefore unable to implement a case lookup table or branch table. This invention provides a method to increase the possibility of implementing these efficient strategies.

Figure 10:
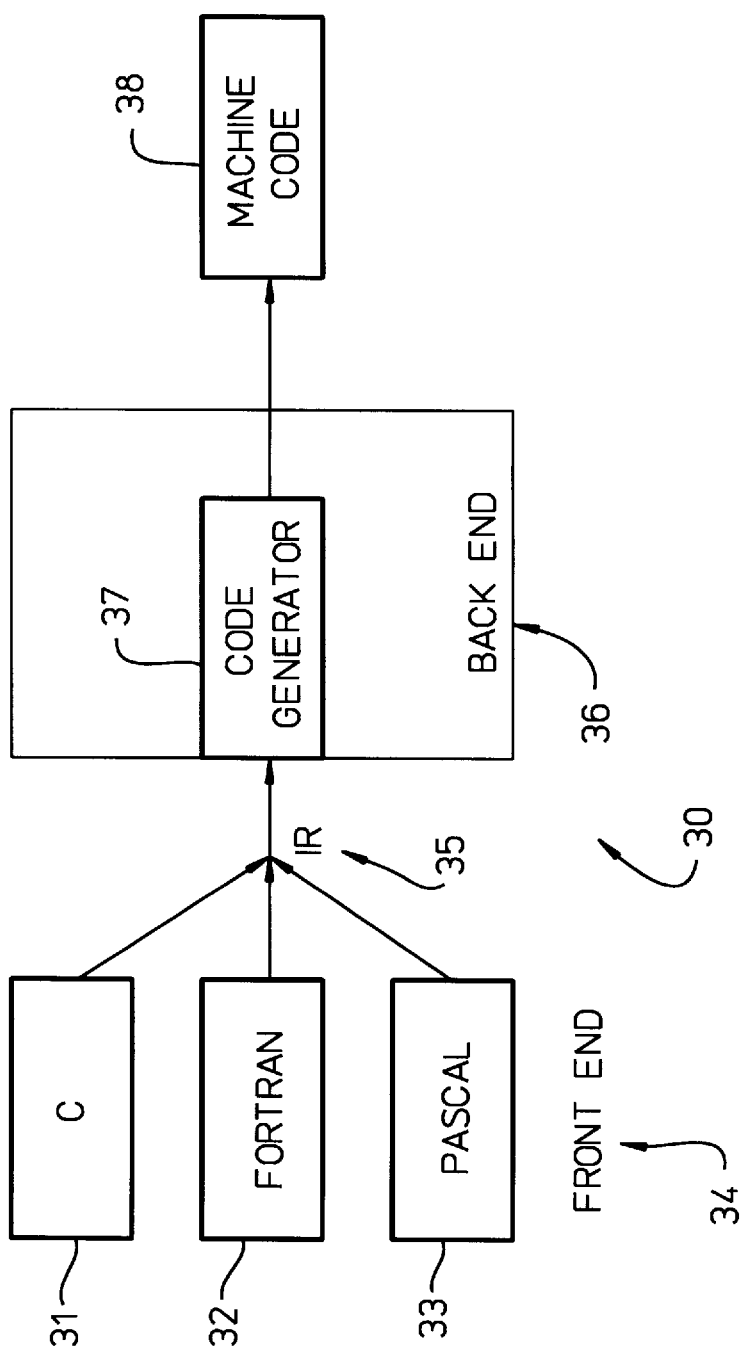
FIG. 10 is a block diagram of a software compiler that can be used in conjunction with the m-bit computer architecture according to the present invention.

Referring to FIG. 10 provides a high level functional overview of compiler construction. Various frontends in such languages as C 31, Fortran 32, and Pascal 33 interface with the backend 35. The frontends (collectively identified by the numeric designator 34) generate a machine independent intermediate representation (IR) 35 which is consumed by the backend. The backend 35 uses a code generator 37 to translate the IR 35 into machine code 3 8 which after liking and loading can be run directly on a computer. In this common model, the IR allows an automatic or static variable, the case variable, to be read from or written by accessing its offset from a predefined location. The case variable is stored in the memory of the computer.

According to the present invention, the frontend generates an initial list of indices. The code generator 37 takes this list of indices and generates a first list of m-bit case indices, the minimum number of bits the m-bit case indices can be represented in being a number less than or equal to m; generates a second list of n-bit case indices, the minimum number of bits the n-bit case indices can be represented in being a number greater than m; generates a first case table from the first list of m-bit case indices; generates a second case table from the second list of n-bit case indices; and generates runtime code to determine which case table to execute.

Figures 3A, 3B:
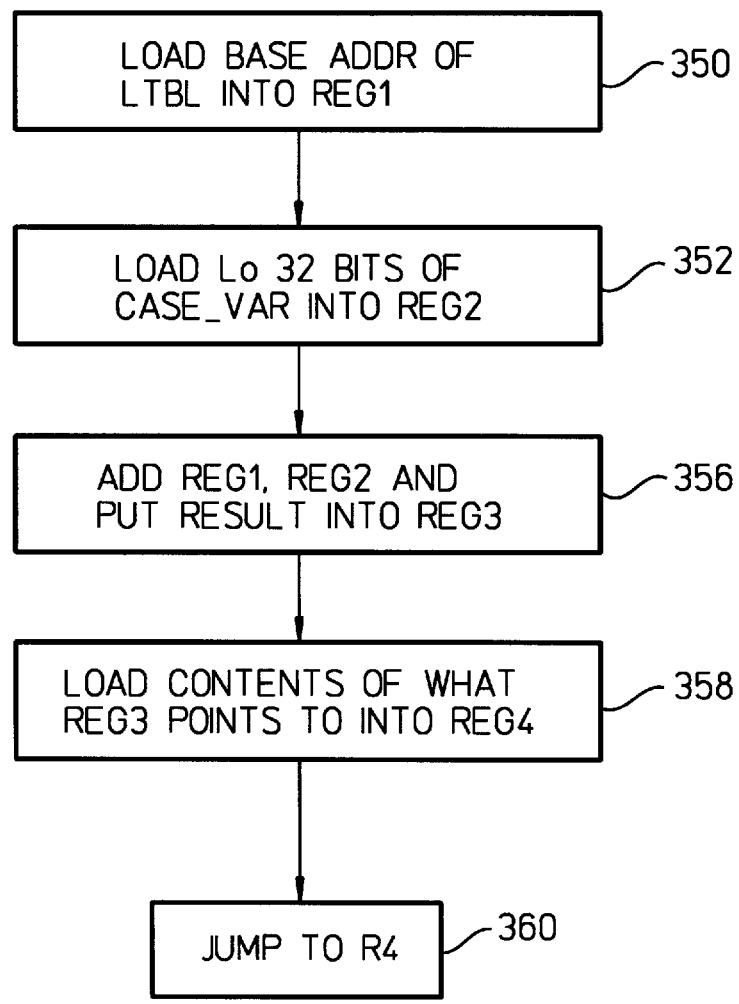
FIG. 3A shows a lookup table used in the implementation of the case table shown in FIG. 1.
FIG. 3B shows a 32-bit assembly language implementation that implements a lookup table for FIG. 1.
Figure 4:
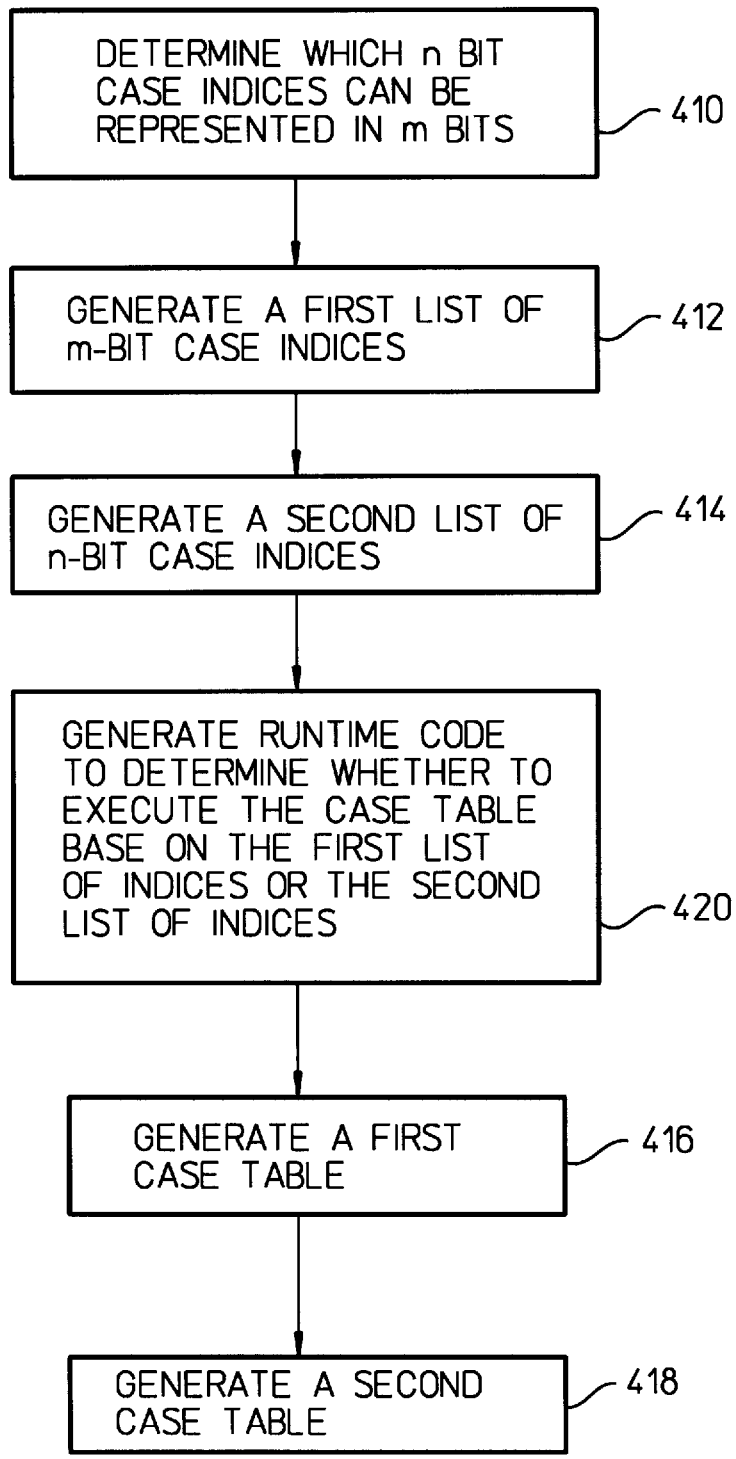
FIG. 4 shows a flowchart of the steps for generating a case table for a n-bit case variable according to the present invention.

It is understood that the above description is intended to be illustrative and not restrictive. For example, although in the description of the invention, the examples use the values m equal to 32 and n equal to 64, m or n may be any integral value where m is less than n. Further, whether the present invention is performed using an index matching implementation as shown in FIGS. 2A and 2B or a lookup table implementation as shown in FIGS. 3A and 3B is not critical. Further, the implementation for the n-bit case indices and the m-bit case indices may be the same or different. An example of different implementations for the n-bit and m-bit case indices would be implementing the more efficient m-bit indices in an index matching implementation while the n-bit component of the case table was performed in a lookup table implementation. The scope of the invention should be determined with reference to the appended claims, along with the full scope of equivalents to which such claims are entitled.

What is claimed is:

1. A computer-implemented method for generating case table constructs for a n-bit case variable on a computer system having a m-bit architecture, where n is greater than m, the method including the steps of:

at compile time, generating code to determine at runtime when an n-bit case variable can be processed as an m-bit case variable and when the n-bit case variable is required to processed as an n-bit case variable;

at compile time, generating a first list of m-bit case indices for n-bit case variables that can be processed as an m-bit case variable, wherein the minimum number of bits the m-bit case indices can be represented in being a number less than or equal to m; and at compile time, generating a second list of n-bit case indices for n-bit case variables that are required to be processed as an n-bit case variable, wherein the minimum number of bits the n-bit case indices can be represented in being a number greater than m, wherein the case table construct generated is used to optimize runtime code that runs on the computer system.

2. The method recited in claim 1 further including the steps of:

generating runtime code to determine whether to execute a case table corresponding to the first list of m-bit indices;

generating runtime code to determine whether to execute a case table corresponding to the second list of n-bit indices.

3. The method recited in claim 2 further including the steps of generating a first case table from the first list of m-bit case indices; and generating a second case table from the second list of n-bit case indices.

4. The method recited in claim 1 wherein the method for determining whether the n-bit case variable can be represented in m bits includes the steps of: determining the two's complement value of the n-bit value; performing a sign extended extraction on the most significant bit of the lowermost m bits of the n-bit value; comparing the result of the sign extended extraction to the uppermost m bits of the n-bit value.

5. The method recited in claim 4 wherein the n-bit case variable can be represented in m-bits when the result of the sign extended extraction is equal to the uppermost m bits of the n-bit value.

6. The method recited in claim 4 wherein the n-bit case variable cannot be represented in m-bits when the result of the sign extended extraction is not equal to the uppermost m bits of the n-bit value.

7. A compiler for generating case table constructs for a n-bit case variable on a computer system having a m-bit architecture, where n is greater than m, the compiler including:

a code generator for generating at compile time a first list of m-bit case indices for n-bit case variables that can be processed as an m-bit case variable, the minimum number of bits the m-bit case indices can be represented in being a number less than or equal to m, for generating at compile time a second list of n-bit case indices for n-bit case variables that are required to be processed as an n-bit case variables, the minimum number of bits the n-bit case indices can be represented in being a number greater than m, and for generating at compile time runtime code to determine which case table to execute.

* * * * *